Figure 1:
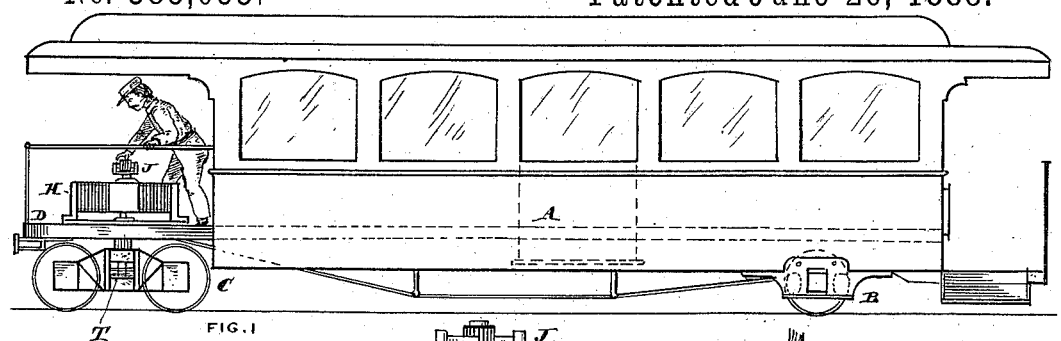

(No Model.) 2 Sheets—Sheet 1.

R. M. HUNTER.
ELECTRIC RAILWAY.

No. 385,053. Patented June 26, 1888.

Attest
E. M. Breckinreed
E. McDermott

Inventor
R. M. Hunter

N. PETERS, Photo-Lithographer, Washington, D. C.

(No Model.) 2 Sheets—Sheet 2.
R. M. HUNTER.
ELECTRIC RAILWAY.
No. 385,053. Patented June 26, 1888.
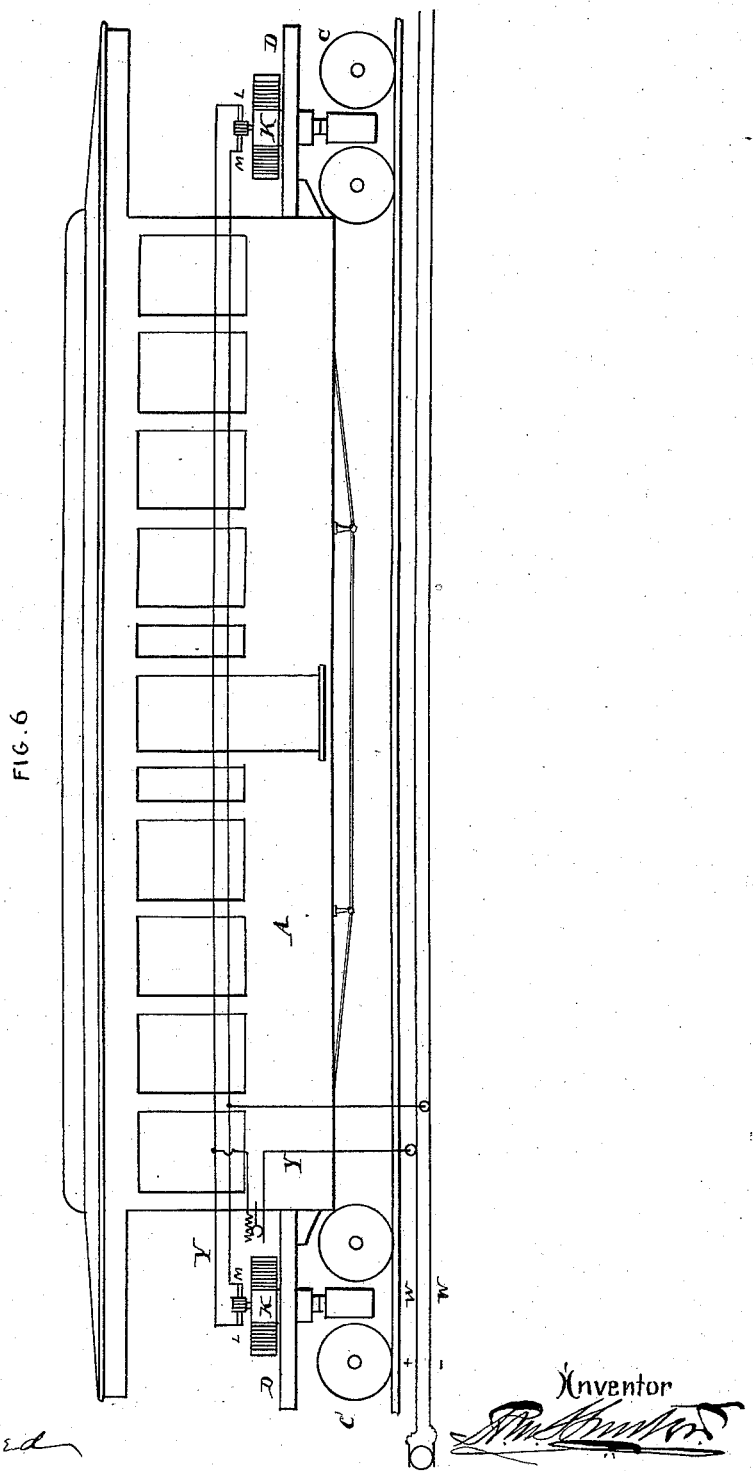

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 385,053, dated June 26, 1888.

Application filed October 19, 1886. Serial No. 216,643. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways, but more particularly to the construction of vehicles therefor and the arrangement of the motor or power mechanism thereon, all of which is fully set forth in the following specification and shown in the accompanying drawings, which form part thereof.

In carrying out my invention I provide a car or vehicle of considerable length with a projecting or forward platform, preferably higher than the car-floor, and under this platform is pivoted an ordinary car-truck, while the rear portion of the car-body is preferably supported upon a single pair of wheels. This will enable an extremely long car to turn short curves, and will at the same time prevent the forward or the rear portion of the car from tilting up by overloading at the other end. The front platform or truck supports an electric motor, which is arranged in a manner to be examined and regulated by the attendant, whose position is upon the said platform. The motor-shaft may be arranged vertically and pass through on the king-bolt by which the truck is pivoted to the car body or platform, and said shaft may connect with the truck-axles by gearing, sprocket wheels and chains, or otherwise. If desired, the motor might be arranged horizontally and carried on the truck, but in such a manner as to be within operative position for the attendant. By arranging the propelling-truck close to the front of the car the centrifugal action in rapid movement about curves would prove less objectionable, as the forward end of the car would not be required to swing around with a greater velocity than the movements of the trucks. By lowering the center of gravity of the entire vehicle it is enabled to run more smoothly on rough roads and is less liable to leave the track. By placing the truck close to the end of the car two cars coupled together would work more as if on a hinge-joint having a fixed position.

It is evident that both ends of the car may be provided with pivoted trucks and each be provided with an electric motor, and the doors might open into the car from the sides, as is customary in European railroad-coaches.

Figure 2:
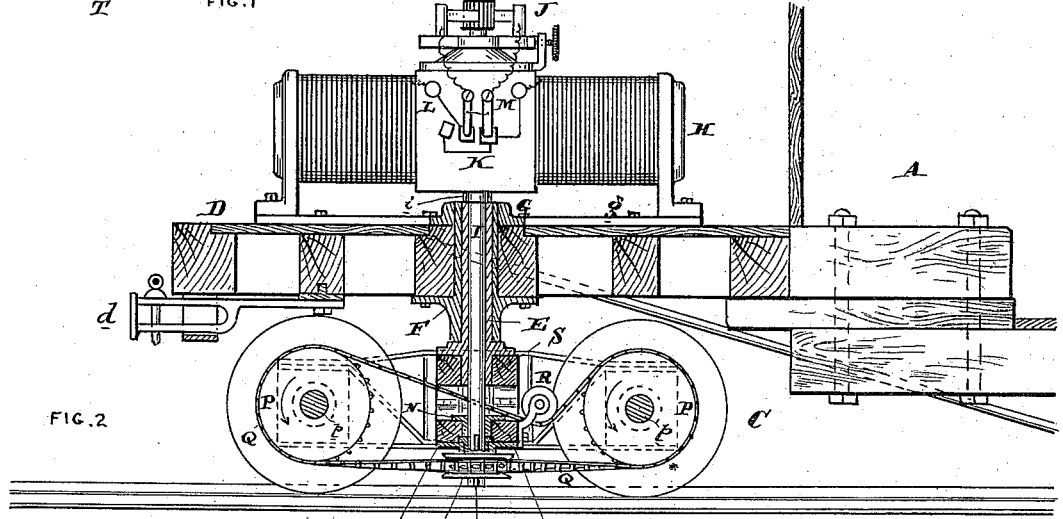
Figure 3:
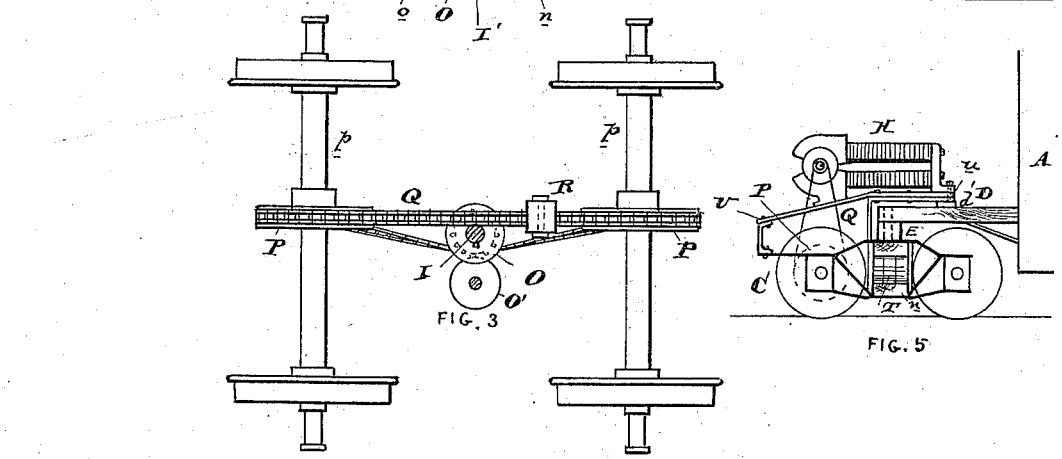
Figure 5:
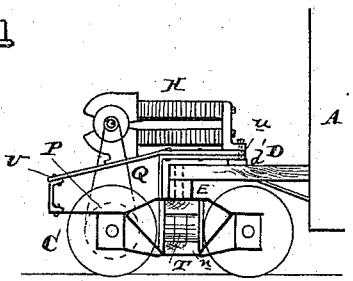
Figure 4:
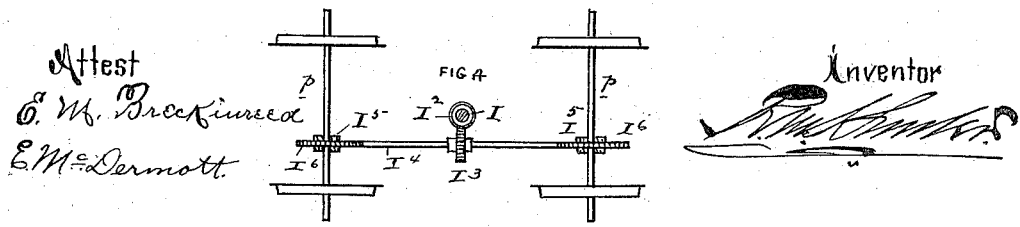

In the drawings, Figure 1 is a side elevation of an electric railway-car embodying my invention. Fig. 2 is a sectional elevation of the forward truck of same. Fig. 3 is a plan view of the truck-wheels and operating mechanism for propelling the same. Fig. 4 is a similar view of a modification of same, showing how gearing could be applied in place of a chain and sprocket-wheel. Fig. 5 is a side elevation of the forward truck, showing a modified method of attaching the motor. Fig. 6 is a side elevation of one form of my electric car embodying my invention, showing the use of a pivoted truck at each end of the car, and with doors opening into the sides, as in European steam railway-cars.

A is the car-body, and has the front platform, D, formed thereon, preferably at greater height than the floor of the car. As shown, the rear end of the car-body is provided with a passenger-platform and a step; but it is evident that the entrance to the car-body might be upon the side, as indicated in dotted lines. The rear end of the car-body is supported upon the pair of trailing wheels B, similar to those found in any well-constructed streetcar, and the forward end of the car is supported upon a truck, C, pivoted under the platform D and close to the forward portion thereof. This truck may be of any suitable construction, that shown being similar to the well-known form of car-truck. To the bolster S of said truck is secured the vertical kingbolt E, made hollow to allow the passage of the armature-shaft I, and this king-bolt is received in a sleeve or bearing, F, bolted to the platform D. By this means the truck may revolve about the motor-shaft as a center. The bolster S is supported upon springs T in the usual manner, said springs resting upon the cross-beam *n* of the truck-frame. The motor-shaft I at its lower extremity is received in a bearing, N, secured to the cross-beam *n*, and is provided on the end with a feather or key, I'.

O is a flanged sprocket-wheel supported to the beam *n* by a plate, *o*, and receives the end of the motor-shaft, revolving with it, but allowing the said shaft to rise and fall without displacing said sprocket-wheel.

Q is a sprocket-chain which passes around the wheel O and the sprocket-wheels P on the axles $p$ of the truck, whereby power is transmitted from the motor to said axles.

R is a guide wheel or pulley, and is adapted to depress the sprocket-chain Q sufficiently below the bolster S to allow of its vertical movement; or, if desired, said pulley R might be sufficiently raised to hold the sprocket-chain above said bolster and to one side of the pivot-connection. Centered on the upper portion of the sleeve F is a hub or bearing, G, which may be formed of brass or non-magnetic metal, and has extensions $g$ secured to the platform, and upon which the motor H rests, and to which it is secured. The shaft I is arranged vertically, and the end-thrust is received by a collar, $i$, arranged above the hub G or the king-bolt E.

L and M are the positive and negative binding-posts for connecting with the source of electrical supply, and, as shown, the motor is shunt-wound, having a separate armature-circuit from that of the field-magnets, and the current in the armature-circuit may be reversed by switch K to reverse the motor.

J represents a commutator and its brushes, which will come upon the upper portion of the machine and in a well-exposed condition for inspection.

From this construction it will be observed that the car-body is supported upon springs and may rise and fall without in any wise interfering with the positive connection between the motor and truck-axles.

O′, Fig. 3, represents the presser-wheel for keeping the sprocket-chain between the flanges of the wheel O and upon the teeth of the said wheel.

In place of using a sprocket-chain and sprocket-wheels, as explained above, it is evident that any suitable construction of gearing might be substituted therefor, one form of which being shown in Fig. 4, in which $I^2$ is a worm on the end of the motor-shaft I and gears with the worm-wheel $I^3$ upon a shaft, $I^4$, the ends of which are provided with worms $I^5$, meshing with worm-wheels $I^6$ upon the truck-axles $p$. The worm $I^2$ is fitted to the end of the motor-shaft I, with provision for end-play of the shaft, as in the case of the construction shown in Figs. 2 and 3, so that the car-body may rise and fall upon its springs without interfering with the motor-connections. Again, in place of making the armature-shaft pass through the king-bolt, the motor might be secured upon a frame, U, carried upon the truck, and therefore would form part of the truck-frame, as shown in Fig. 5, and in this case the motor-shaft would be connected to the truck-axle by a positive connection. As here shown, the motor would revolve about the king-bolt E in exact accordance with the movements of the truck, while in the first-mentioned construction the motor was secured fast to the car-body or its platform and the truck was free to move independently thereof. In the construction shown in Fig. 5, when the car is unloaded the rear end, $u$, of the frame U might rest upon a bearing-plate, $d'$, on the platform D to reduce the unnecessary strain when the motor is out of use, or, if the platform D is not supported upon springs, then the parts $u$ and $d'$ may remain in contact all the time and yet in effect allow a free movement of the truck and its motor.

$d$ is the draw-bar, and may be used when connecting two or more cars together.

W W in Fig. 6 are two line-conductors for supplying positive and negative electric current.

Y is the motor-circuit connecting the binding-posts L M with the source of electrical energy. Any other source of electrical energy may be used, if desired.

I do not limit myself to the details of construction herein set out, as it is evident that they may be modified in various ways while keeping the essential features of the invention precisely the same.

Having now described my invention, what I claim as new, and desire to secure by Letters Patent, is—

1. The combination of the car-body having seats for passengers, with an operating-platform at its forward end and exterior to the car-body proper, a centrally-pivoted car-truck arranged under said platform and close to the forward end of the car, and an electric motor carried by the car to impart motion to the truck, having a rotating shaft and a connection between the motor-shaft and truck-axle.

2. The combination of the car-body having a platform at one end projecting beyond the car-body, a four-wheeled truck pivoted beneath the platform at a point between its four wheels, an electric motor to propel said truck, an electric circuit and current controlling mechanism, and a power-transmitting connection between the said motor and truck, whereby the truck may move freely without affecting the motor-connection with it.

3. The combination of the car-body having a platform at one end projecting beyond the car-body, a four-wheeled truck pivoted beneath the platform at a point between its four wheels, an electric motor to propel said truck, an electric circuit and current controlling mechanism, and a power-transmitting connection between the said motor and truck extending through the pivot-connection, whereby the truck may move freely without affecting the motor-connection with it.

4. The combination of the car-body with a motor-platform at its forward end, a truck pivoted to said car-body under the platform, an electric motor to propel said car supported upon said platform and having its shaft arranged vertically and extended down through the pivot or king-bolt of the truck, and a connection between said shaft and truck-axle.

5. The combination of the car-body with a motor-platform at its forward end, a truck pivoted to said car-body under the platform, an electric motor to propel said car supported upon said platform, having its shaft arranged vertically and extended down through the pivot or king-bolt of the truck, and a connection between said shaft and truck-axles, consisting of a sprocket-chain and sprocket-wheels.

6. The combination of the car-body with a motor-platform at its forward end, a truck pivoted to said car-body under the platform, an electric motor to propel said car supported upon said platform, having its shaft arranged vertically and extended down through the pivot or king-bolt of the truck, and a connection between said shaft and truck-axles, consisting of a sprocket-chain and sprocket-wheels and guide-wheel, the chain passing over the sprocket-wheels on the axles and around the sprocket-wheel on the shaft and under the guide-wheel.

7. The combination of the car-body with a motor-platform at its forward end, a truck pivoted to said car-body under the platform, an electric motor to propel said car supported upon said platform, having its shaft arranged vertically and extended down through the pivot or king-bolt of the truck, a flanged sprocket-wheel on the end of said shaft, a sprocket-wheel on the axle of the truck, and a chain passing about said sprocket-wheels.

8. The combination of a car-body supported on springs, a four-wheeled truck pivoted to said car-body between its four wheels, an electric motor carried by the car-body and movable vertically therewith, a source of electric supply, an electric circuit for the motor, a switch to control the motor, and a compensating connection between the said motor and truck-axle, extending through the pivot or king-bolt of the truck and between the four wheels, whereby the connection between the motor and axle is the same irrespective of the vertical movements of said car-body upon the truck, substantially as and for the purpose specified.

9. The combination of a car-body supported on springs, a four-wheeled truck pivoted to said car-body between the four wheels, an electric motor carried by the car-body and movable vertically therewith, and a compensating connection between the said motor and both truck-axles, whereby the connection between the motor and axle is the same irrespective of the vertical movements of said car-body upon the truck, substantially as and for the purpose specified.

10. The combination of a car-body having a forward platform supported on springs, a truck pivoted to said car-body under said platform, an electric motor carried by the car-body platform and movable vertically therewith, and a compensating connection between the said motor and truck-axle, whereby the connection between the motor and axle is the same irrespective of the vertical movements of said car-body upon the truck, substantially as and for the purpose specified.

11. The combination of the car-body having seats for passengers, having a motor-operating platform at its forward end and exterior to the car-body proper, a centrally-pivoted truck under said platform, an electric motor exterior to the car-body arranged immediately above said truck in operative position from said platform, and a power-transmitting connection between the motor and truck-axle.

12. The combination of the car-body supported on springs, a truck pivoted to said car-body by a hollow king-bolt, an electric motor on said car-body having a vertical shaft extending through the hollow king-bolt, and a compensating power-transmitting connection from the lower part of said shaft to the truck-axle.

13. The combination of the car-body supported on springs, a truck pivoted to said car-body by a hollow king-bolt, an electric motor on said car-body having a vertical shaft extending through the hollow king-bolt, and a compensating power-transmitting connection from the lower part of said shaft to the truck-axle, consisting of a sprocket-wheel rotating with said shaft, but independent of its vertical movements, a sprocket-wheel on the truck-axle, and a sprocket-chain passing about both sprocket-wheels.

14. The combination of the car-body supported on springs, a truck pivoted to said car-body by a hollow king-bolt, an electric motor on said car-body having a vertical shaft extending through the hollow king-bolt, and a compensating power-transmitting connection from the lower part of said shaft to the truck-axle, consisting of a sprocket-wheel rotating with said shaft, but independent of its vertical movements, a sprocket-wheel on the truck-axle, a sprocket-chain passing about both sprocket-wheels, and a presser-wheel to keep the chain on the motor-shaft sprocket-wheel.

15. The combination of the passenger-car body arranged low down and close to the rails with the high forward platform, an electrically-propelled truck of greater height than the distance from the car-body to the rails arranged under said raised platform and pivoted thereto, an electric circuit carried by the car to supply electricity to the electrically-propelled truck, and means to control the flow of current in said circuit.

16. The combination of the passenger-car body arranged low down and close to the rails with the high forward platform, an electrically-propelled truck of greater height than the distance from the car-body to the rails, arranged under said raised platform and pivoted thereto, a line-conductor arranged parallel with the railway, an electric circuit carried by the car, receiving electricity from said line-conductor, and adapted to supply electricity to the electrically-propelled truck, and means to control the flow of current in said circuit.

17. The combination of the car-body having provision for passengers and supported on springs, an electrically-propelled truck pivoted to said car-body, which it supports, an electric motor to propel the said truck, a direct mechanical power-transmitting connection between the motor and axle of the truck and arranged within the area of the truck, whereby the truck may freely move and the car-body rise and fall without affecting the motor-connection with the axle, a motor-circuit carried by the car and extending to the motor, and means to control the flow of current through said motor-circuit arranged upon the car-body.

18. The combination of a car-body having accommodations for passengers and a motor-operating platform at its forward end, a centrally-pivoted electrically-propelled truck arranged under said platform, an electric motor for propelling said truck arranged exterior to the car-body and above the truck-base and in operative position from said platform, a power-transmitting connection between the motor and axle of the truck, a source of electric supply, a motor-circuit carried by the car and connecting with the terminals of the motor, and means for regulating the motor within reach of the operator on said platform.

19. The combination of a car-body having a motor-operating platform at its forward end, an electrically-propelled truck pivoted under said platform, a source of electric supply, a motor-circuit carried by the car and supplying current to the motor, and regulating means on or at the platform for controlling the flow of current to the motor of the electrically-propelled truck.

In testimony of which invention I hereunto set my hand.

RUDOLPH M. HUNTER.

Witnesses:
RICHD. S. CHILD, Jr.,
E. M. BRECKINREED.